(12) United States Patent
Jo et al.

(10) Patent No.: US 10,275,102 B2
(45) Date of Patent: Apr. 30, 2019

(54) DISPLAY DEVICE

(71) Applicant: LG DISPLAY CO., LTD., Seoul (KR)

(72) Inventors: Heungju Jo, Chungju-si (KR); JeongKweon Park, Paju-si (KR); Chan Park, Gumi-si (KR); SangGul Lee, Seoul (KR); SangEun Han, Jeonju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/584,614

(22) Filed: May 2, 2017

(65) Prior Publication Data

US 2017/0351357 A1 Dec. 7, 2017

(30) Foreign Application Priority Data

Jun. 7, 2016 (KR) .................. 10-2016-0070190

(51) Int. Cl.
*G06F 3/041* (2006.01)
*G06F 3/044* (2006.01)
*G06F 1/16* (2006.01)

(52) U.S. Cl.
CPC ............ *G06F 3/044* (2013.01); *G06F 1/1637* (2013.01); *G06F 1/1643* (2013.01); *G06F 3/041* (2013.01); *G06F 3/0412* (2013.01); *G06F 2203/04105* (2013.01)

(58) Field of Classification Search
CPC .................. G06F 3/041; G06F 3/044; G06F 2203/04103; G06F 2203/04105; G06F 2203/04106
See application file for complete search history.

(56) References Cited

U.S. PATENT DOCUMENTS

| | | | |
|---|---|---|---|
| 2016/0047964 A1* | 2/2016 | Kim | G02B 6/002 |
| | | | 362/608 |
| 2016/0062500 A1* | 3/2016 | Kessler | G06F 3/0414 |
| | | | 345/174 |
| 2016/0216833 A1* | 7/2016 | Butler | G06F 3/0412 |
| 2016/0299625 A1* | 10/2016 | Kano | G06F 3/0414 |
| 2017/0220162 A1* | 8/2017 | Ko | B32B 7/04 |
| 2017/0277328 A1* | 9/2017 | Kurasawa | G06F 3/0412 |
| 2017/0308221 A1* | 10/2017 | Li | G02B 6/0051 |

\* cited by examiner

*Primary Examiner* — Md Saiful A Siddiqui
(74) *Attorney, Agent, or Firm* — Birch, Stewart, Kolasch & Birch, LLP

(57) ABSTRACT

Discussed is a display device in which a first pressure electrode configuring a pressure touch panel is adhered to a first polarizing film attached on a lower end of a panel. The display device includes a display panel displaying an image, a capacitive touch panel provided in the display panel and including a plurality of touch electrodes, a first polarizing film adhered to a first side surface of the display panel, a first pressure electrode part adhered to a first side surface of the first polarizing film and including a first pressure electrode, and a second pressure electrode part spaced apart from the first pressure electrode part and including a second pressure electrode facing the first pressure electrode.

6 Claims, 3 Drawing Sheets

DISPLAY DEVICE

CROSS-REFERENCE TO RELATED APPLICATIONS

This application claims the priority benefit of the Korean Patent Application No. 10-2016-0070190 filed on Jun. 7, 2016, which is hereby incorporated by reference as if fully set forth herein.

BACKGROUND

Field of the Invention

The present invention relates to a display device, and more particularly, to a display device having two touch functions.

Discussion of the Related Art

Touch panels are a type of input device that is included in display devices, such as liquid crystal display (LCD) devices, plasma display panels (PDPs), organic light emitting display devices, electrophoretic display (EPD) devices, etc., and enable a user to input information by directly touching a screen with a finger, a pen or the like while looking at the display device.

There are various methods where the display devices sense a touch by using a touch panel.

For example, a touch sensing unit may sense a capacitance variation of each of touch electrodes included in a touch panel when a finger contacts the touch panel, thereby determining whether or not there is a touch. Touch panels based on such a method are referred to as capacitive touch panels.

In another example, the touch sensing unit may sense a variation of a capacitance caused by a change in an interval between two touch electrodes spaced apart from each other, thereby determining whether or not there is a touch. Touch panels based on such a method are referred to as pressure touch panels.

In a related art display device including a capacitive touch panel and a pressure touch panel, the capacitive touch panel may be built into a panel that displays an image, or may be attached on the panel. The pressure touch panel includes a first pressure electrode having a plate type and a plurality of second pressure electrodes arranged in a block type. In this case, the first pressure electrode is disposed between a first substrate configuring the panel and a first polarizing film, and the second pressure electrode is disposed under a light guide plate.

In the display device including the capacitive touch panel and the pressure touch panel which are driven in different manners as described above, interference can occur between touch electrodes configuring the capacitive touch panel and the first pressure electrode. Therefore, noise can be added into a capacitance touch sensing signal generated in the capacitive touch panel, and moreover, noise can be added into a pressure touch sensing signal generated in the pressure touch panel.

Moreover, since the first pressure electrode is provided on a lower end of the first substrate including various elements for displaying an image, noise can be added into the pressure touch sensing signal generated in the pressure touch panel. Also, in this case, noise is added into signals supplied to the elements, and for this reason, an image cannot normally be displayed.

Moreover, since the first polarizing film is disposed between the first pressure electrode and the second pressure electrode, an interval between the first pressure electrode and the second pressure electrode increases, and for this reason, a sensitivity of the pressure touch sensing signal generated in the pressure touch panel can be reduced. Particularly, if the display device is an LCD device, a light guide plate or an optical sheet is disposed between the first polarizing film and the second pressure electrode, and for this reason, a sensitivity of the pressure touch sensing signal generated in the pressure touch panel can be more reduced.

SUMMARY

Accordingly, the present invention is directed to provide a display device that substantially obviates one or more problems due to limitations and disadvantages of the related art.

An aspect of the present invention is directed to provide a display device in which a first pressure electrode configuring a pressure touch panel is adhered to a first polarizing film attached on a lower end of a panel.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including a display panel displaying an image, a capacitive touch panel provided in the display panel and including a plurality of touch electrodes, a first polarizing film adhered to a first side surface of the display panel, a first pressure electrode part adhered to a first side surface of the first polarizing film and including a first pressure electrode, and a second pressure electrode part spaced apart from the first pressure electrode part and including a second pressure electrode facing the first pressure electrode.

The first pressure electrode may be provided as one in the first pressure electrode part and is a plate type, and the second pressure electrode having a block type may be provided in plurality in the second pressure electrode part.

The first pressure electrode part may include a first film which is transparent, the first pressure electrode having a plate type deposited on a first side surface of the first film, and an auxiliary electrode deposited on an outer portion of the first pressure electrode in a tetragonal frame type.

The display device may further include a pressure touch sensing unit driving the first pressure electrode and the second pressure electrode, the pressure touch sensing unit being electrically connected to the auxiliary electrode.

The display device may further include a passivation layer, wherein the first pressure electrode and a region of the auxiliary electrode except a region of the auxiliary electrode electrically connected to the pressure touch sensing unit may be covered by the passivation layer.

A second side surface of the first film may be adhered to the first side surface of the first polarizing film.

The second pressure electrode part may include a second film which is transparent, and the second pressure electrode deposited on a first side surface of the second film in a block type. The second pressure electrode may be provided in plurality on the first side surface of the second film.

The display device may further include a light guide plate provided between the first pressure electrode part and the second pressure electrode part to output light, which is incident from a light source, toward the display panel, and an optical sheet part provided between the light guide plate and the first pressure electrode part to output the light, which is incident from the light guide plate, in a direction vertical to the first side surface of the display panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE EMBODIMENTS

Figure 1:
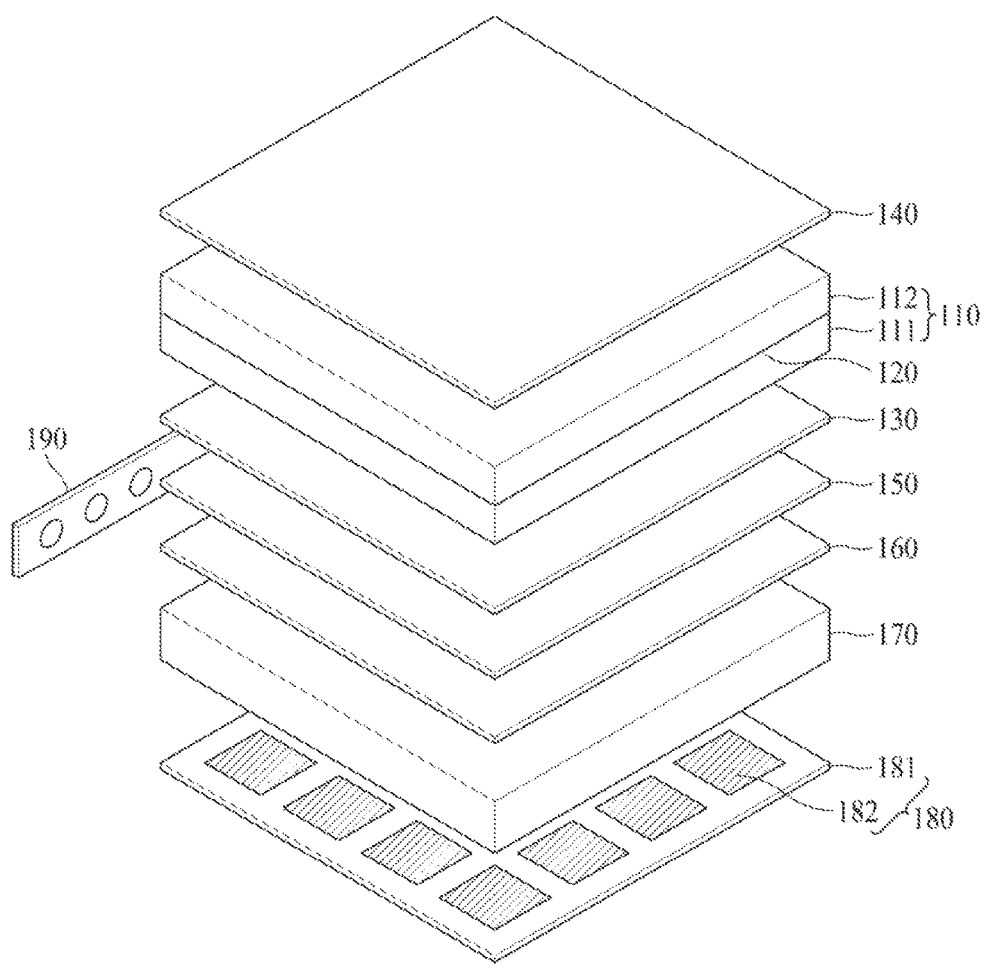
FIG. 1 is an exemplary diagram illustrating a configuration of a display device according to an embodiment of the present invention.

Reference will now be made in detail to the exemplary embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Furthermore, the present invention is only defined by scopes of claims.

In the specification, in adding reference numerals for elements in each drawing, it should be noted that like reference numerals already used to denote like elements in other drawings are used for elements wherever possible.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter, embodiments of the present invention will be described in detailed with reference to the accompanying drawings. In this disclosure below, particularly, for convenience of a description, an LCD device will be described as an example of the present invention, but the present invention is not limited thereto. That is, the present invention may be applied to various display devices such as organic light emitting display devices, EPD devices, etc.

FIG. 1 is an exemplary diagram illustrating a configuration of a display device according to an embodiment of the present invention. All components of the display device according to all embodiments of the present invention are operatively coupled and configured.

The display device according to an embodiment of the present invention, as illustrated in FIG. 1, may include a panel 110 that displays an image, a capacitive touch panel 120 that is included in the panel 110 and includes a plurality of touch electrodes, a first polarizing film 130 that is adhered to a first side surface of the panel 110, a second polarizing film 140 that is adhered to a second side surface of the panel 110, a first pressure electrode part 150 that is adhered to a first side surface of the first polarizing film 130 and includes a first pressure electrode, a second pressure electrode part 180 that is spaced apart from the first pressure electrode part 150 and includes a second pressure electrode 182 facing the first pressure electrode, a light guide plate 170 that is provided between the first pressure electrode part 150 and the second pressure electrode part 180 and outputs light, which is incident from a light source 190, toward the panel 110, and an optical sheet part 160 that is provided between the light guide plate 170 and the first pressure electrode part 150 and outputs the light, which is incident from the light guide plate 170, in a direction vertical to the first side surface of the panel 110. Also, a reflector may be disposed on a lower end of the light guide plate 170. In this case, the second pressure electrode part 180 may be disposed on a lower end of the reflector, and moreover, may be disposed between the light guide plate 170 and the reflector. Also, the second pressure electrode part 180 may perform a function of the reflector, and in this case, the reflector may not be provided.

First, the panel 110 may include a thin film transistor (TFT) substrate on which a plurality of gate lines and a plurality of data lines are arranged, a color filter (CF) substrate that faces the TFT substrate, and a liquid crystal that is injected between the CF substrate and the TFT substrate.

The panel 110 may be an organic light emitting display panel. In this case, the light guide plate 170, the light source 190, and the optical sheet part 160 may not be provided. However, the display device may further include a separate element for adjusting an interval between the first pressure electrode part 150 and the second pressure electrode part 180.

A plurality of pixels may be defined by intersections of the gate lines and the data lines, and each of the pixels may include a TFT which is driven by a signal transmitted through each of a corresponding gate line and a corresponding data line.

If the panel 110 is the organic light emitting display panel, each of the pixels may include two or more TFTs.

When at least one TFT is driven, the panel 110 may display an image.

Second, the panel 110 may include the capacitive touch panel 120.

The capacitive touch panel 120 may be configured in an in-cell type, an on-cell type, an add-on type, or a hybrid in-cell type.

Particularly, in the capacitive touch panel 120 configured in the in-cell type or the hybrid in-cell type, the plurality of touch electrodes configuring the capacitive touch panel 120 may be arranged on the TFT substrate in a process of manufacturing the TFT substrate.

The capacitive touch panel 120 may be configured in a mutual type or a self-capacitance type.

The capacitive touch panel 120 having the mutual type may include a plurality of driving touch electrodes supplied with a touch driving signal and a plurality of receiving touch electrodes that transmit signals, induced from the driving touch electrodes, to a capacitive touch sensing unit. The driving touch electrodes and the receiving touch electrodes may be provided to intersect each other. The capacitive touch panel 120 having the self-capacitance type may include a plurality of self-capacitance touch electrodes arranged in a block type. A generic name for the driving touch electrodes, the receiving touch electrodes, and the self-capacitance touch electrodes may be a touch electrode.

When a finger of a user or a pen contacts the capacitive touch panel 120, capacitances of the touch electrodes may vary, and thus, the amount of electrical charge, the amount of current, or a level of a voltage induced to each of the touch electrodes may vary. The capacitive touch sensing unit may analyze the variation to determine whether the panel 110 is touched.

If the capacitive touch panel 120 is configured in the in-cell type, the capacitive touch sensing unit may supply a common voltage to the touch electrodes in an image display period where an image is displayed, and thus, the panel 110 may display an image.

Moreover, if the capacitive touch panel 120 is configured in the in-cell type, the capacitive touch sensing unit may supply the touch driving signal to the touch electrodes in a touch sensing period where a touch is sensed, and then, may analyze a touch sensing signal received from each of the touch electrodes to determine whether the panel 110 is touched.

Third, the first polarizing film 130 may be adhered to the first side surface of the panel 110, and the second polarizing film 140 may be adhered to the second side surface of the panel 110.

Fourth, the first pressure electrode part 150 may be adhered to the side surface of the first polarizing film 130 and may include the first pressure electrode. The second side surface of the first polarizing film 130 may be adhered to the panel 110.

The second pressure electrode part 180 may be spaced apart from the first pressure electrode part 150 and may include the second pressure electrode 182 facing the first pressure electrode.

A pressure touch sensing unit may supply the touch driving signal to the first pressure electrode part 150 or the second pressure electrode part 180.

In this case, when the panel 110 is pressed by a finger or a pen, the first pressure electrode part 150 may be pressed, and thus, an interval between the first pressure electrode part 150 and the second pressure electrode part 180 may be reduced.

A capacitance of when the interval between the first pressure electrode part 150 and the second pressure electrode part 180 is reduced may differ from a capacitance of when the interval between the first pressure electrode part 150 and the second pressure electrode part 180 increases because the first pressure electrode part 150 is not pressed.

The pressure touch sensing unit may analyze a variation of the capacitance to determine whether the panel 110 is pressed.

Fifth, if the panel 110 is a liquid crystal panel included in an LCD device, the light guide plate 190 that outputs the light, which is incident from the light source 190, toward the panel 110 may be provided between the first pressure electrode part 150 and the second pressure electrode part 180. In this case, the optical sheet part 160 that outputs the light, which is incident from the light guide plate 170, in a direction vertical to the first side surface of the panel 110 may be provided between the light guide plate 170 and the first pressure electrode part 150. The optical sheet part 160 may include two or more optical sheets.

If the light source 190 is disposed to face the first pressure electrode part 150, the light guide plate 170 may not be provided. In this case, the second pressure electrode part 180 may be disposed between the optical sheet part 160 and the first pressure electrode part 150, disposed between the optical sheet part 160 and the light source 190, or disposed on a lower end of the light source 190.

Sixth, the display device according to an embodiment of the present invention may include a gate driver for supplying a gate pulse to the gate lines, a data driver for supplying data voltages to the data lines, and a controller for controlling an operation of the gate driver and an operation of the data driver.

The gate driver may shift a gate start pulse transmitted from the controller according to a gate shift clock to sequentially supply the gate pulse to the gate lines.

The data driver may convert image data input from the controller into analog data voltages and may respectively supply the data voltages for one horizontal line to the data lines at every one horizontal period where the gate line is supplied to a corresponding gate line.

The controller may receive a timing signal, including a data enable signal, a dot clock, etc., from an external system to generate control signals for controlling an operation timing of the data driver and an operation timing of the gate driver. Also, the controller may realign input video data received from the external system to output image data, generated through the realignment, to the data driver.

Figure 2:
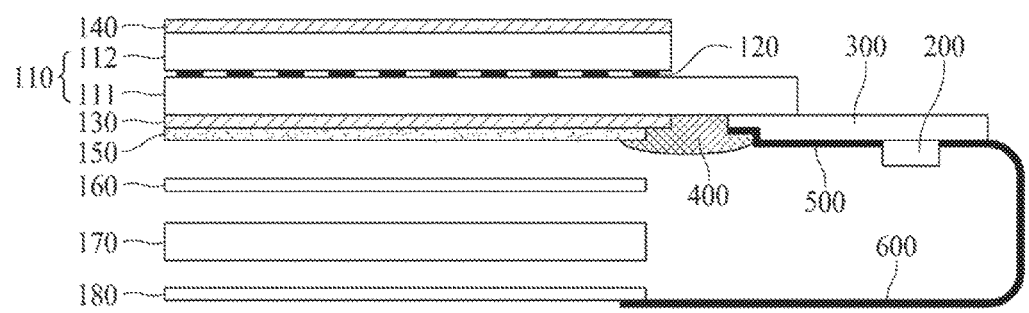
FIG. 2 is an exemplary diagram illustrating a cross-sectional surface of a display device according to an embodiment of the present invention.

FIG. 2 is an exemplary diagram illustrating a cross-sectional surface of the display device according to an embodiment of the present invention.

As described above, the display device according to an embodiment of the present invention may include the panel 110, the capacitive touch panel 120, the first polarizing film 130, the first pressure electrode part 150, and the second pressure electrode part 180.

Particularly, if the display device is an LCD device, the display device may further include the second polarizing film 140, the light source 190, the light guide plate 170, and the optical sheet part 160.

In this case, the second pressure electrode part 180 may be disposed on an upper end of the optical sheet part 160, disposed on a lower end of the optical sheet part 160, or disposed on a lower end of the light guide plate 170. In FIG. 2, the display device where the second pressure electrode part 180 is disposed on the lower end of the light guide plate 170 is illustrated as an example of the present invention.

The capacitive touch panel 120, as described above, may be configured in various types. In FIG. 2, the display device including the capacitive touch panel 120 having the in-cell type is illustrated as an example of the present invention. In this case, the touch electrodes configuring the capacitive touch panel 120 may be configured in the mutual type or the self-capacitance type.

In the capacitive touch panel 120 having the mutual type, a plurality of driving touch electrodes and a plurality of receiving touch electrodes may be provided to intersect each other. In the capacitive touch panel 120 having the self-capacitance type, the touch panel 120 may include a first substrate 111 and a second substrate 112, and a plurality of self-capacitance touch electrodes having a block type may be provided on the first substrate 111.

In the image display period, the capacitive touch sensing unit may supply the common voltage to the touch electrodes. In the touch sensing period, the capacitive touch sensing unit may supply the touch driving signal to the touch electrodes, and then, may analyze touch sensing signals received from the touch electrodes to determine whether the panel 110 is touched.

The first polarizing film 130 may be adhered to the first side surface of the panel 110 by using an adhesive.

The first pressure electrode part 150 may be adhered to the first side surface of the first polarizing film 130 by using an adhesive.

A flexible substrate 300 with the pressure touch sensing unit 200 mounted thereon may be connected to the first substrate 111.

The capacitive touch sensing unit may be mounted on the flexible substrate 300, and moreover, the controller may be mounted on the flexible substrate 300. However, the capacitive touch sensing unit and the controller may be mounted on another substrate connected to the first substrate 111.

The first pressure electrode part 150 and the pressure touch sensing unit 200 may be connected to each other by a connection electrode 400. The connection electrode 400 may be a silver (Ag) dot.

For example, the first pressure electrode part 150 may be adhered to the first polarizing film 130 and the flexible substrate 300 may be connected to the first substrate 111, and then, the connection electrode 400 may be coated on at least one point of the first pressure electrode part 150.

In this case, the first pressure electrode part 150 and the connection electrode 400 may be electrically connected to each other, and a first line 500 which is included in the flexible substrate 300 and is connected to the pressure touch sensing unit 200 may be electrically connected to the connection electrode 400, whereby the first pressure electrode part 150 and the pressure touch sensing unit 200 may be electrically connected to each other.

The second pressure electrode part 180 may also be connected to the pressure touch sensing unit 200 through a second line 600.

Figure 3:
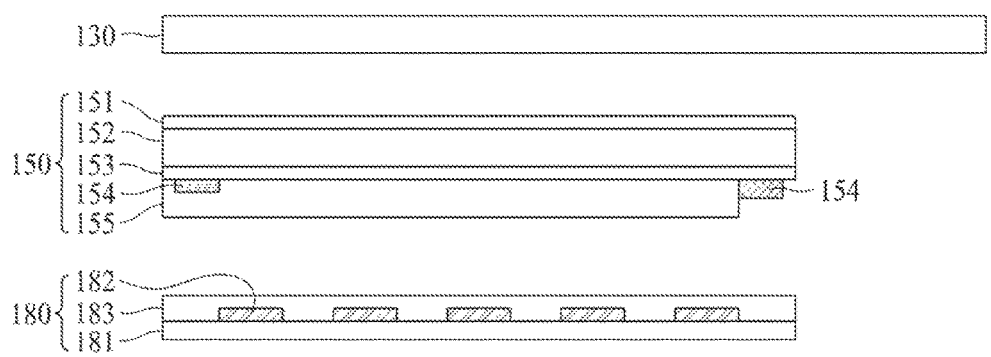
FIG. 3 is an exemplary diagram illustrating in detail a cross-sectional surface of each of a first polarizing film, a first pressure electrode part, and a second pressure electrode part applied to a display device according to an embodiment of the present invention.

FIG. 3 is an exemplary diagram illustrating in detail a cross-sectional surface of each of the first polarizing film 130, the first pressure electrode part 150, and the second pressure electrode part 180 applied to the display device according to an embodiment of the present invention.

As described above, the first pressure electrode part 150 may be adhered to the first side surface of the first polarizing film 130 and may include a first pressure electrode 153.

The first pressure electrode 153 may be provided as one in the first pressure electrode part 150. The first pressure electrode 153 may be a plate type, but is not limited thereto. In other embodiments, at least some of the first pressure electrode 153 and a second pressure electrode 182 corresponding thereto may be a curved type.

For example, as illustrated in FIG. 3, the first pressure electrode part 150 may include a first film 152 which is transparent, the one first pressure electrode 153 which is deposited on a first side surface of the first film 152 and has a plate type, and an auxiliary electrode 154 which is deposited on an outer portion of the first pressure electrode 153 in a tetragonal frame type.

The first film 152 may be formed of a transparent material, and for example, the transparent material may be a cyclo olefin polymer (COP) included in the first polarizing film 130 and the second polarizing film 140.

A second side surface of the first film 152 may face the first side surface of the first polarizing film 130.

When an adhesive 151 is coated on the second side surface of the first film 152, the first film 152 may be adhered to the first side surface of the first polarizing film 130 by the adhesive 151.

The adhesive 151 may use various materials, and for example, may be a pressure sensitive adhesive (PSA) which acts when pressure is applied thereto.

The first pressure electrode 153 may be configured in a plate type, but is not limited thereto. In other embodiments, at least some of the first pressure electrode 153 and a second pressure electrode 182 corresponding thereto may be a curved type.

The auxiliary electrode 154 may be deposited on the outer portion of the first pressure electrode 153 in a tetragonal frame type. A material of the auxiliary electrode 154 may be a material (for example, copper) which is good in conductivity.

The auxiliary electrode 154 and the first pressure electrode 153 may be covered and protected by a passivation layer 155. The passivation layer 155 may be formed of an organic material or an inorganic material, and moreover, may be formed of a complex layer of an organic material and an inorganic material.

The auxiliary electrode 154 may be electrically connected to the connection electrode 400 in at least one point and may be electrically connected to the pressure touch sensing unit 200 that drives the first pressure electrode 153 and the second pressure electrode 182.

To this end, only the first pressure electrode 153 and a region of the auxiliary electrode 154 having a tetragonal frame type, except a region of the auxiliary electrode 154 electrically connected to the pressure touch sensing unit 200 through the connection electrode 400, may be covered by the passivation layer 155.

For example, a right region of the auxiliary electrode 154 illustrated in FIG. 3 may be exposed to the outside without being covered by the passivation layer 155.

The connection electrode 400 may be coated on the right region of the auxiliary electrode 154. To provide an additional description, the exposed region of the auxiliary electrode 154 may be provided to correspond to a region with the connection electrode 400 coated thereon.

As described above, the second pressure electrode part 180 may be spaced apart from the first pressure electrode part 150 and may include the second pressure electrode 182 facing the first pressure electrode 153.

The second pressure electrode 182 having a block type may be provided in plurality in the second pressure electrode part 180.

For example, the second pressure electrode part 180 may include a second film 181, which is transparent, and the second pressure electrode 182 which is deposited on a first side surface of the second film 181 in a block type. In this case, as illustrated in FIG. 3, the second pressure electrode 182 may be provided in plurality on the first side surface of the second film 181.

The second film 181 may be formed of a transparent material, and for example, the transparent material may be the COP included in the first polarizing film 130 and the second polarizing film 140.

However, if the second pressure electrode part 180 is disposed under the light guide plate, particularly, if the second pressure electrode part 180 is disposed under the reflector, a material of the second film 181 is not limited to the transparent material.

Each of the second pressure electrodes 182 may correspond to predetermined coordinates. A size of each of the second pressure electrodes 182 may be adjusted to various sizes, based on the number of touch coordinates.

The second pressure electrodes 182 may be covered by the passivation layer 183.

Each of the second pressure electrodes 182 may be electrically connected to the pressure touch sensing unit 200 through the second line 600.

According to an embodiment of the present invention, since the first polarizing film 130 is inserted between the first pressure electrode 153 and the first substrate 111, an interval between the first pressure electrode 153 configuring the pressure touch panel and the capacitive touch panel 120 and increases in comparison with the related art. Accordingly, interference between the first pressure electrode 153 and the capacitive touch panel 120 is reduced, and thus, a sensitivity of each of touch sensing signals generated in the pressure touch panel and the capacitive touch panel is enhanced.

Moreover, according to an embodiment of the present invention, since the first polarizing film 130 is inserted between the first pressure electrode 153 and the first substrate 111, an interval between each of elements included in the first substrate 111 and the first pressure electrode 153 increases in comparison with the related art. Therefore, interference between the elements and the first pressure electrode 153 is reduced, and thus, noise occurring between the elements and the first pressure electrode 153 is reduced. Accordingly, the quality of an image displayed by the elements is enhanced, and moreover, a sensitivity of a pressure touch sensing signal generated by the first pressure electrode 153 is enhanced.

Moreover, according to an embodiment of the present invention, an interval between the first pressure electrode 153 and the second pressure electrode 182 configuring the pressure touch panel is reduced, and thus, a sensitivity of a touch sensing signal generated from the pressure touch panel is enhanced. For example, in the related art, the first polarizing film is fundamentally inserted between the first pressure electrode and the second pressure electrode, but in an embodiment of the present invention, the first polarizing film 130 may not be inserted between the first pressure electrode 153 and the second pressure electrode 182. Therefore, an interval between the first pressure electrode 153 and the second pressure electrode 182 is further reduced in comparison with the related art, and thus, a sensitivity of a pressure touch sensing signal generated by an interaction between the first pressure electrode 153 and the second pressure electrode 182 is enhanced. Accordingly, whether there is a touch based on pressure is more accurately determined.

Figure 4:
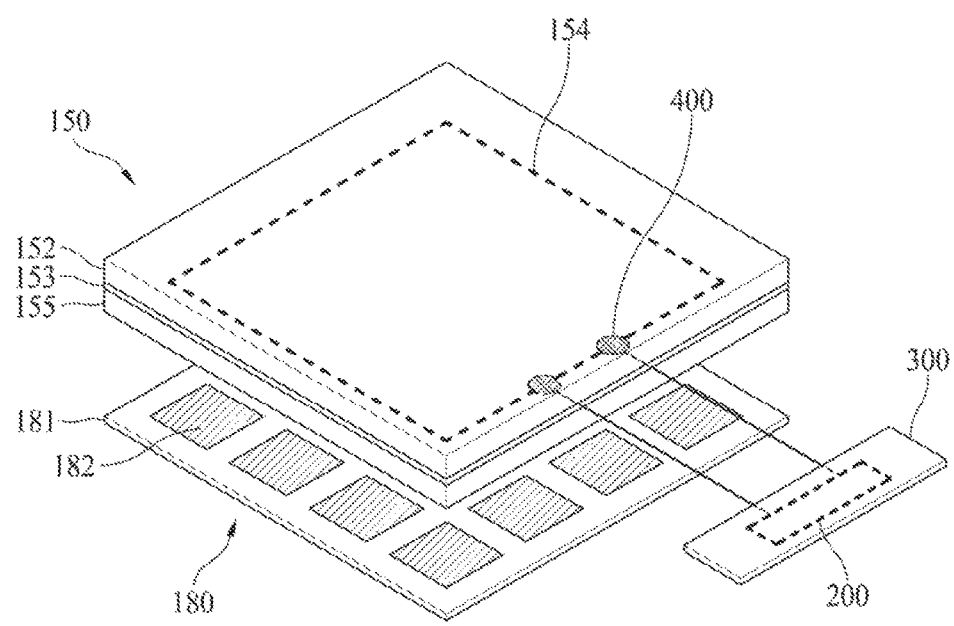
FIG. 4 is a perspective view illustrating a first pressure electrode part and a second pressure electrode part applied to a display device according to an embodiment of the present invention.

FIG. 4 is a perspective view illustrating the first pressure electrode part 150 and the second pressure electrode part 180 applied to the display device according to an embodiment of the present invention.

As described above, the first pressure electrode part 150 may include the first film 152, the first pressure electrode 153, and the auxiliary electrode 154, and may be adhered to the first side surface of the first polarizing film 130 by the adhesive 151.

To provide an additional description, as illustrated in FIG. 4, the auxiliary electrode 154 may be deposited on the outer portion of the first pressure electrode 153 in a tetragonal frame type.

Moreover, the auxiliary electrode 154 may be electrically connected to the connection electrode 400 in at least one point and may be electrically connected to the pressure touch sensing unit 200 that drives the first pressure electrode 153 and the second pressure electrode 182. To this end, only the first pressure electrode 153 and a region of the auxiliary electrode 154 having a tetragonal frame type, except a region of the auxiliary electrode 154 electrically connected to the pressure touch sensing unit 200 through the connection electrode 400, may be covered by the passivation layer 155. The pressure touch sensing unit 200 may be mounted on the flexible substrate 300. In FIG. 4, the first pressure electrode part 150 where the auxiliary electrode 154 is connected to the connection electrode 400 at two points is illustrated.

The second pressure electrode 182, as illustrated in FIG. 4, may be deposited on the first side surface of the second film 181 in a block type, and particularly, a plurality of the second pressure electrodes 182 may be deposited on the second film 181.

A driving method of the display device according to an embodiment of the present invention will be briefly described below.

First, in the image display period, the capacitive touch sensing unit may supply the common voltage to the touch electrodes, and thus, the panel 110 may display an image. In the touch sensing period, the capacitive touch sensing unit may supply the touch driving signal to the touch electrodes, and then, may analyze the touch sensing signals received from the touch electrodes to determine whether the panel 110 is touched. The image display period and the touch sensing period may each be performed only once in one frame period, or may each be performed a plurality of times in one frame period.

Subsequently, the pressure touch sensing unit 200 may supply a touch common voltage to the first pressure electrode 153. Particularly, the touch common voltage is may be supplied to the first pressure electrode 153 through the auxiliary electrode 154. Accordingly, the touch common voltage may be uniformly supplied to a whole region of the first pressure electrode 153.

Finally, the pressure touch sensing unit 200 may analyze a capacitance variation of a signal transmitted from each of the second pressure electrodes 182 to determine whether a touch occurs in each of the second pressure electrodes 182.

For example, when the panel 110 is pressed by a finger or a pen, the first pressure electrode part 150 may also be pressed, and thus, an interval between the first pressure electrode part 150 and the second pressure electrode part 180 is reduced.

A capacitance, a voltage, or an electrical charge of when the interval between the first pressure electrode part 150 and the second pressure electrode part 180 is reduced may differ from a capacitance, a voltage, or an electrical charge of when the interval between the first pressure electrode part 150 and the second pressure electrode part 180 increases because the first pressure electrode part 150 is not pressed.

Therefore, the pressure touch sensing unit 200 may analyze a variation of a capacitance, a voltage, or an electrical charge to determine whether a touch occurs in each of the second pressure electrode parts 180.

As described above, according to the embodiments of the present invention, since an interval between the pressure touch panel and the capacitive touch panel increases, interference between the pressure touch panel and the capacitive touch panel is reduced, and thus, a sensitivity of each of the touch sensing signals generated in the pressure touch panel and the capacitive touch panel is enhanced.

Moreover, according to the embodiments of the present invention, an interval between the first pressure electrode configuring the pressure touch panel and the second pressure electrode is reduced, and thus, a sensitivity of the touch sensing signal generated in the pressure touch panel is enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
    a display panel configured to display an image;
    a capacitive touch panel in the display panel, the capacitive touch panel including a plurality of touch electrodes;
    a first polarizing film adhered to a first side surface of the display panel;
    a first pressure electrode part adhered to a first side surface of the first polarizing film, the first pressure electrode part including a first pressure electrode; and
    a second pressure electrode part spaced apart from the first pressure electrode part, the second pressure electrode part including a second pressure electrode facing the first pressure electrode,
    wherein the first pressure electrode part comprises:
    a first film being transparent;
    the first pressure electrode deposited on a first side surface of the first film, and having a plate type; and
    an auxiliary electrode deposited on an outer portion of the first pressure electrode and having a tetragonal frame shape overlapping with the first pressure electrode,
    wherein the auxiliary electrode is configured to uniformly supply a touch common voltage to an entire region of the first pressure electrode,
    wherein the display device further comprises:
    a pressure touch sensing unit configured to drive the first pressure electrode and the second pressure electrode, the pressure touch sensing unit being electrically connected to the auxiliary electrode; and
    a passivation layer,
    wherein the first pressure electrode and a majority of the auxiliary electrode are covered by the passivation layer, and
    wherein a minority of the auxiliary electrode is not covered by the passivation layer in a connection region for electrically connecting the auxiliary electrode to the pressure touch sensing unit.

2. The display device of claim 1, wherein:
    the first pressure electrode is provided as one in the first pressure electrode part, and
    the second pressure electrode having a block type is provided in plurality in the second pressure electrode part.

3. The display device of claim 1, wherein a second side surface of the first film is adhered to the first side surface of the first polarizing film.

4. The display device of claim 1, wherein the second pressure electrode part comprises:
    a second film being transparent; and
    the second pressure electrode deposited on a first side surface of the second film in a block type,
    wherein the second pressure electrode is provided in plurality on the first side surface of the second film.

5. The display device of claim 1, further comprising:
    a light guide plate between the first pressure electrode part and the second pressure electrode part, the light guide plate outputting light, which is incident from a light source, toward the display panel; and
    an optical sheet part between the light guide plate and the first pressure electrode part, the optical sheet part outputting the light, which is incident from the light guide plate, in a direction vertical to the first side surface of the display panel.

6. The display device of claim 1, wherein the auxiliary electrode is connected between the first pressure electrode and the pressure touch sensing unit.

* * * * *